(12) United States Patent
Clarke et al.

(10) Patent No.: US 9,623,304 B2
(45) Date of Patent: Apr. 18, 2017

(54) THROWER

(71) Applicant: INNOVATIVE PET PRODUCTS (PTY) LTD, Bundall (AU)

(72) Inventors: Hazel Clarke, Bundall (AU); Joseph Clarke, Bundall (AU)

( * ) Notice: Subject to any disclaimer, the term of this patent is extended or adjusted under 35 U.S.C. 154(b) by 0 days.

(21) Appl. No.: 14/375,473

(22) PCT Filed: Jan. 31, 2013

(86) PCT No.: PCT/AU2013/000083
§ 371 (c)(1),
(2) Date: Jul. 30, 2014

(87) PCT Pub. No.: WO2013/113063
PCT Pub. Date: Aug. 8, 2013

(65) Prior Publication Data
US 2015/0013653 A1    Jan. 15, 2015

(30) Foreign Application Priority Data

Jan. 31, 2012  (AU) ................................ 2012900349
Jun. 5, 2012   (AU) ................................ 2012902330

(51) Int. Cl.
*A63B 59/20* (2015.01)
*A63B 65/12* (2006.01)
(Continued)

(52) U.S. Cl.
CPC ............. *A63B 59/02* (2013.01); *A01K 15/025* (2013.01); *A63B 59/20* (2015.10); *A63B 65/122* (2013.01); *A63B 2208/14* (2013.01)

(58) Field of Classification Search
CPC ......... F41B 3/00; A63B 59/02; A63B 65/122; A63B 2208/14; A01K 15/025
(Continued)

(56) References Cited

U.S. PATENT DOCUMENTS 491,558 A    2/1893  Hill
1,164,609 A   12/1915  Darton
(Continued)

FOREIGN PATENT DOCUMENTS

DE    202004004745 U1    7/2004
GB         2271937 A     4/1994
(Continued)

OTHER PUBLICATIONS

PCT International Search Report, Mar. 14, 2013, Australian Patent Office ISA.

*Primary Examiner* — Alvin Hunter
*Assistant Examiner* — Jeffrey Vanderveen
(74) *Attorney, Agent, or Firm* — Eagar & Martin Pty Ltd

(57) ABSTRACT

A thrower includes an elongate arm. A handle is attached to one end of the arm. A retaining device has a base attached to an opposite end of the arm and at least one gripping member extending from the base to define a retention volume together with the base. The, or each, gripping member is resiliently displaceable with respect to the base to permit the retaining device to be urged on to the object to be thrown such that the, or each, gripping member is displaced to permit the object to be received in the retention volume, with the, or each, gripping member subsequently retaining the object in the retention volume.

5 Claims, 12 Drawing Sheets

(51) Int. Cl.
*A01K 15/02* (2006.01)
*A63B 59/02* (2006.01)

(58) Field of Classification Search
USPC .............................................. 124/5
See application file for complete search history.

(56) References Cited

U.S. PATENT DOCUMENTS

| | | | |
|---|---|---|---|
| 1,175,035 A * | 3/1916 | Wooster | ............... F41B 3/00 |
| | | | 124/41.1 |
| 1,585,446 A | 5/1923 | Warwick | |
| 1,535,029 A | 4/1925 | Murch | |
| 1,615,266 A | 1/1927 | French | |
| 3,428,036 A * | 2/1969 | Parker | ............. A63B 59/20 |
| | | | 124/41.1 |
| 3,589,349 A | 6/1971 | Parker | |
| 3,841,292 A | 10/1974 | Hoffman | |
| 6,076,829 A | 6/2000 | Oblack | |
| 7,677,994 B2 | 3/2010 | Matsumoto et al. | |
| 7,686,001 B2 | 3/2010 | Fitt | |
| D634,489 S | 3/2011 | Page et al. | |
| D637,248 S | 5/2011 | Levin et al. | |
| 8,028,684 B1 | 10/2011 | Weissmann et al. | |
| 2008/0072886 A1 | 3/2008 | Cattlin | |
| 2011/0017184 A1 * | 1/2011 | Henry | ............... A63H 33/18 |
| | | | 124/5 |
| 2011/0100345 A1 * | 5/2011 | Minneman | ............ F41B 3/04 |
| | | | 124/5 |
| 2012/0006309 A1 | 1/2012 | Levin et al. | |

FOREIGN PATENT DOCUMENTS

| | | |
|---|---|---|
| GB | 2385537 A | 8/2003 |
| GB | 2435163 A | 8/2007 |
| GB | 2475396 A | 5/2011 |
| WO | 2008005613 A2 | 1/2008 |
| WO | 2008035992 A2 | 3/2008 |

\* cited by examiner

THROWER

CROSS REFERENCE TO RELATED APPLICATION

This application is a national stage entry of PCT/AU2013/000083 filed on Jan. 31, 2013, which in turn claims the benefit of priority to AU Application No. 2012902330 filed Jun. 5, 2012 and AU Application No. 2012900349 filed Jan. 31, 2012, each of the foregoing patent applications is incorporated by reference herein in its entirety for any purpose whatsoever.

FIELD OF THE INVENTION

This invention relates to a thrower. More particularly, but not exclusively, this invention relates to a thrower for throwing, hurling or flinging objects for retrieval by a dog, for example.

BACKGROUND TO THE INVENTION

A popular pastime amongst dog owners is to throw or fling various objects for retrieval by a dog. At present, there are a number of devices that are used to assist with such throwing or flinging.

An example of such a device includes an elongate arm with a handle at one end and a receptacle at an opposite end. The arm and the receptacle are configured and respectively oriented so that when a ball is received in the receptacle the ball can be projected or hurled from the receptacle by swinging the arm.

SUMMARY OF THE INVENTION

According to the invention, there is provided a thrower that comprises
 an elongate arm;
 a handle attached to one end of the arm; and
 a retaining device having a base attached to an opposite end of the arm and at least one gripping member extending from the base to define a retention volume together with the base, the, or each, gripping member being configured so that an object to be thrown can be retained in the retention volume, the object having a range of different sizes.

The, or each, gripping member may be resiliently displaceable with respect to the base to permit the retaining device to be urged on to the object to be thrown such that the, or each, gripping member is displaced to permit the object to be received in the retention volume.

Thus, a user can manipulate the thrower to pick up objects that are rigid and inflexible since the, or each, gripping member can be displaced to accommodate the object. With prior art devices, some reliance is placed on the resilient deformability of the object, such as ball, since the receptacle is relatively rigid. It follows that the thrower of the invention can be used to pick up a wide variety of objects.

The base may be generally part-ellipsoidal or part-spherical to accommodate an object that is generally spherical or ellipsoidal or similar. However, the base is also suitable for accommodating objects having other shapes.

The retaining device may include at least three gripping members spaced apart and extending from a peripheral edge of the base. More particularly, the retaining device may include four or more gripping members. The gripping members may be configured to define an entrance zone to the retention volume such that when ends of the gripping member are urged against a ball to be thrown, the gripping members move apart to enlarge the entrance zone to permit passage of the ball into the retention volume.

Each gripping member may be elongate and of a flexible, resilient material so that when the gripping members move apart, they do so against a bias of the material. The gripping members may have an inward curved portion at least partially bounding the retention volume and outward curved portions defining the entrance zone. The outward curved portions may be configured so that when they are urged on to a ball the gripping members are forced apart, against their bias, to enlarge the entrance zone to accommodate passage of the ball at least partially into the retention volume. A return of the gripping members can serve to obstruct passage out of the volume or grip the object.

A number of slots or holes may be defined in the peripheral edge of the base. Each gripping member may have a projection extending from a free end of the outward curved portion. Each projection may be received in a respective slot to secure the gripping members to the base. Each projection may be in the form of a lug or the like with a rectangular profile. Likewise, each hole may also have a rectangular profile.

The gripping members may have a substantially rectangular transverse cross-section.

A retention device may be arranged on each projection to enhance attachment of the gripping members to the base. The retention device may be in the form of a tab or the like which extends from the lug to engage an internal surface of the associated slot. Each projection may be of a resiliently flexible material with the tab forming part of the projection to be urged back towards a remainder of the projection when the projection is urged into the slot. Thus, the bias of the tab can serve to retain the projection in the slot. In one example, each projection is of sprung metal with the tab being pivotal, against a bias of the metal, towards an opening defined by the projection, when the projection is urged into the slot.

Instead, each gripping member may define an opening or slot in the free end of the outward curved portion. A number of retaining devices may be arranged about the peripheral edge of the base. The retaining devices may be received in each slot of respective gripping members to retain the gripping members in position. For example, each retaining device may be in the form of a spring that is mounted in a reinforced portion of the base. The spring may be a coil spring and a portion of spring wire may extend from the peripheral edge of the base to be received in a respective slot of a gripping member.

In this embodiment, the springs impart further resilient characteristics to the gripping members, alleviating strain on the gripping members. Thus, the gripping members can move apart, in use, at least partly due to the resilient deformation of the springs.

The retaining device may include four gripping members and associated slots equally spaced about the peripheral edge of the base, with one pair of gripping members aligned with the handle and thus with a direction in which the object is to be thrown.

In some cases, a gripping member that is distal with respect to the handle and the material defining its associated slot may experience a significant amount of stress, particularly when the object is relatively heavy or is thrown vigorously. Thus, in one embodiment, the retaining device may include a gripping member in the form of a tab or lug that is shorter than one or more of the gripping members and extends from the periphery aligned with the handle and the direction in which the object is to be thrown. The tab or lug cooperates with the gripping members to retain the object in the retention volume and, since it is more rigid and shorter than the gripping members, is able to resist damage to itself and the base during use.

The inventor(s) envisage that the tab or lug can be used with one or two other gripping members, instead of four. For example, the retaining device can include the tab or lug and one oppositely positioned gripping member. Instead, the retaining device can include the tab or lug and two spaced gripping members positioned with respect to the tab or lug to retain the object to be thrown in the retention volume.

The arm may be attached to the base so that the base opens generally orthogonally with respect to the arm.

The arm may be curved and of a resiliently flexible material to enhance a throwing effect.

The handle, arm and base may be of a one-piece moulding. In particular, the handle, arm and base may be moulded from a resiliently flexible plastics material.

Embodiments of the invention are now described, by way of example, with reference to the accompanying drawings.

DETAILED DESCRIPTION OF THE PREFERRED EMBODIMENTS

Figure 1:
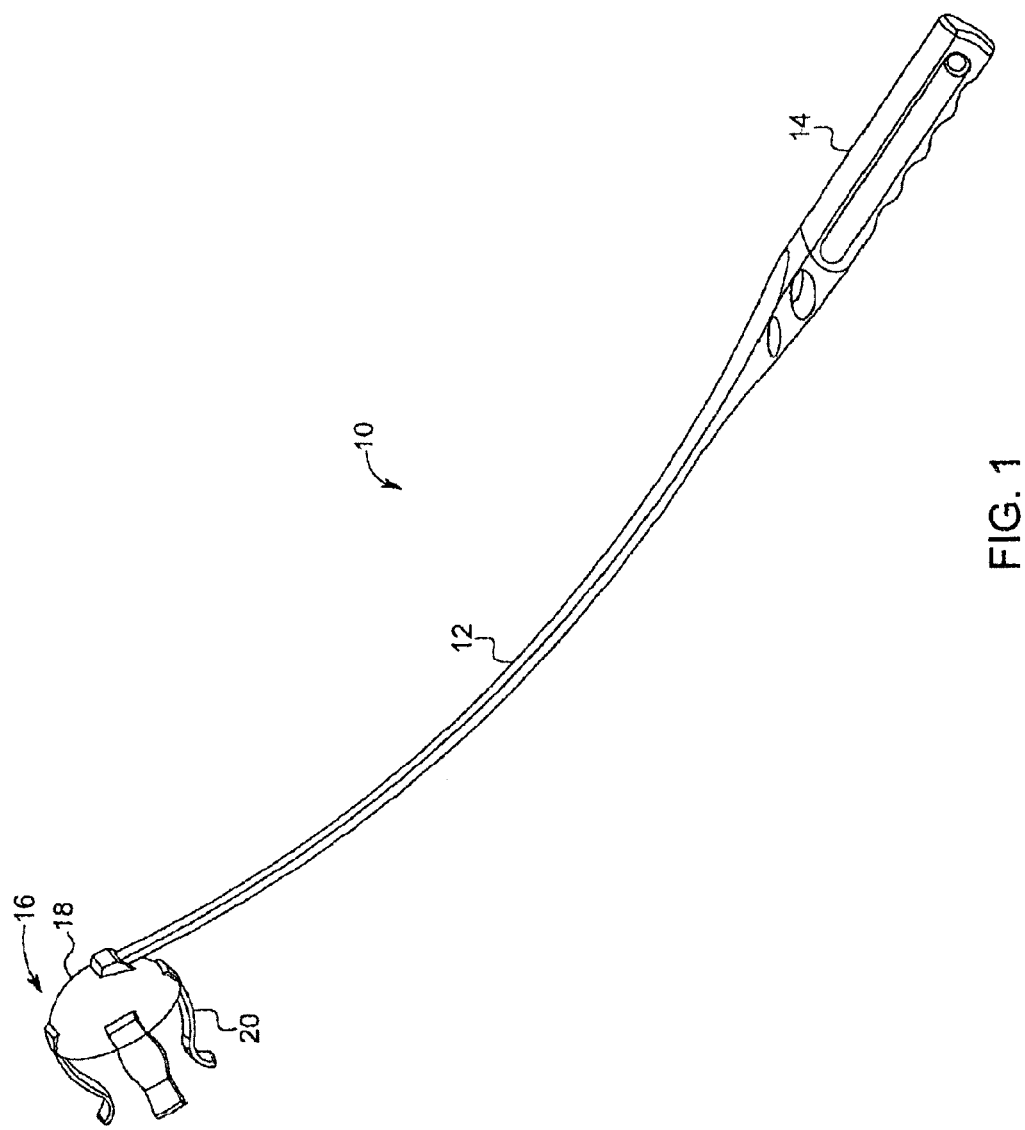
FIG. 1 shows a three-dimensional view of a first exemplary embodiment of a thrower, in accordance with the invention.

In FIG. 1, reference numeral 10 generally indicates a first exemplary embodiment of a thrower, in accordance with the invention.

The thrower 10 is intended for throwing, hurling or flinging various objects. In this particular embodiment, the thrower 10 is suited for throwing balls of various sizes. However, it is envisaged that the thrower 10 can also be used for throwing other objects of various sizes.

The thrower 10 includes an arm 12. A handle 14 is attached to one end of the arm 12. A retaining device 16 is attached to an opposite end of the arm 12.

Figure 2:
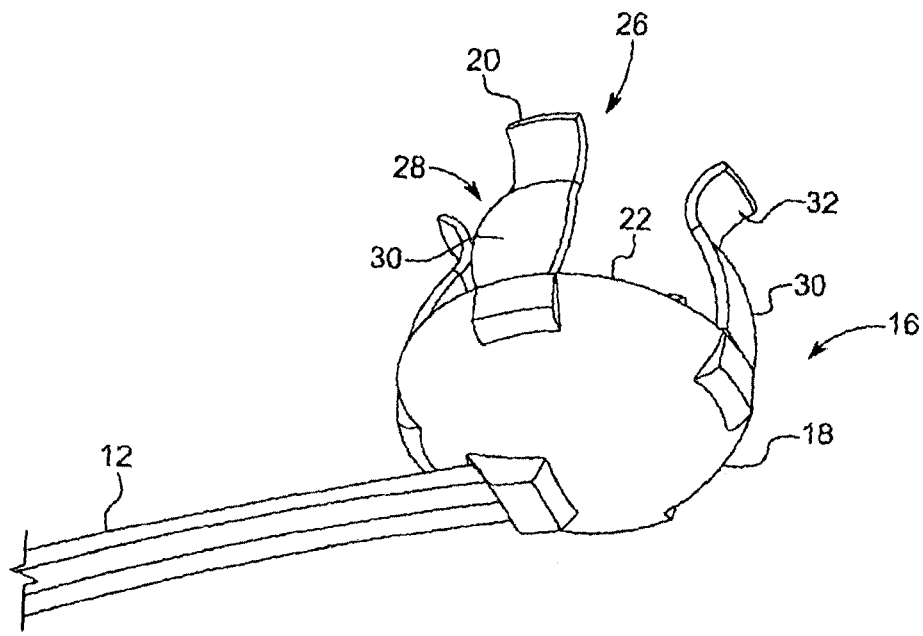
FIG. 2 shows a three-dimensional view, from underneath, of an exemplary retaining device of the thrower.
Figure 3:
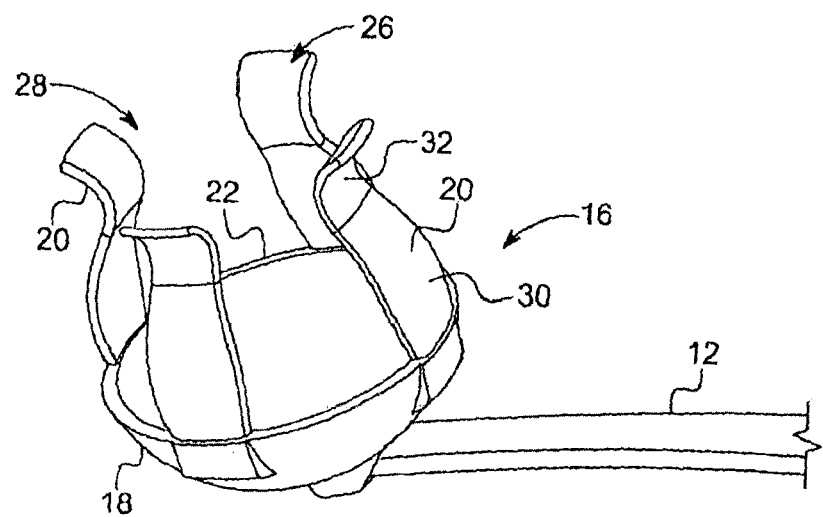
FIG. 3 shows a three-dimensional view, from above, of the retaining device.

The retaining device 16 includes a base in the form of a generally part-spherical cup 18. The cup 18 has a wall that terminates at a circular periphery 22 (FIGS. 2 and 3) of the cup 18 that is generally aligned with a plane extending across an opening of the cup 18. The inventor(s) envisages that the cup 18 could also be generally part-ellipsoidal.

A number of gripping members 20 are attached to the periphery 22 so that they extend generally orthogonally with respect to the plane of the cup-opening. In this example, four gripping members 20 are attached to the periphery 22. However, it will be appreciated that any number of gripping members 20, preferably three or more, can be attached to the periphery 22. It is to be appreciated that a person of ordinary skill in the field would understand how to position, for example three gripping members 20, for functionality.

The gripping members 20 are configured to define an entrance zone 26 to a retention volume 28 defined by the members 20 and the cup 18. In particular, the gripping members 20 are configured so that when the retaining device 16 is urged onto an object, the gripping members 20 are displaced to enlarge the entrance zone 26 and to permit the object to pass into the retention volume 28.

Each gripping member 20 is elongate and is of a resiliently flexible material so that when the gripping members 20 move apart, they do so against a bias of the material. Each gripping member 20 has an inward curved portion 30 and an outward curved portion 32. The portions 32 define the entrance zone 26. The portions 32 are configured so that when they are urged onto a ball or object of a particular size, the gripping members 20 are forced apart to enlarge the entrance zone 26, allowing the ball into the retention volume 28. A bias of the gripping members 20 results in them subsequently obstructing the volume 28 or bearing against the object to retain the object in the volume 28.

The periphery 22 defines a number of holes, recesses, slots or sockets 24 (FIGS. 4 and 5) that correspond with respective gripping members 20. A projection or lug 34 extends from a free end of each portion 30 of the gripping member 20. The lugs 34 and the sockets 24 are dimensioned so that the lugs 34 can be received in respective sockets 24 to retain the members 20 in attachment with the cup 18. Each lug 34 and its associated socket 24 has a rectangular profile. However, other profiles can also be suitable depending on requirements.

Figure 4:
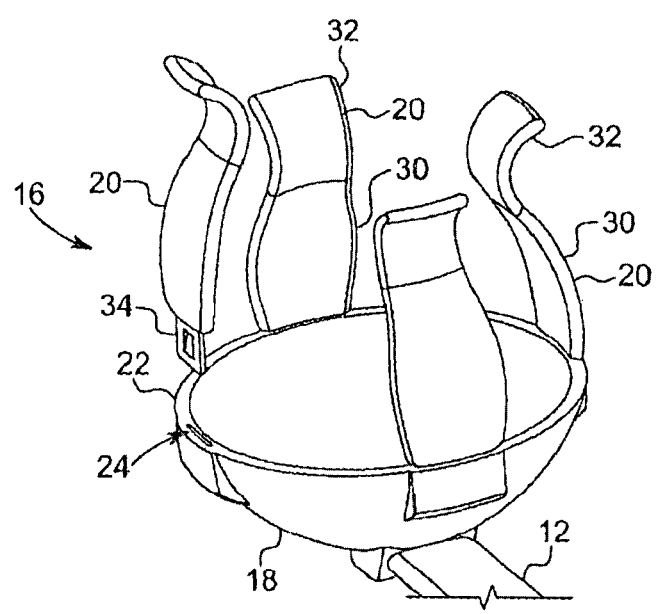
FIG. 4 shows a three-dimensional view of the retaining device illustrating an exemplary manner in which gripping members of the retaining device are connected to a base.
Figure 5:
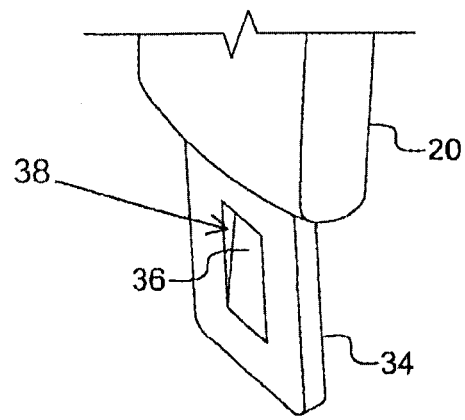
FIG. 5 shows a three-dimensional view of part of one of the gripping members of the device.
Figure 6:
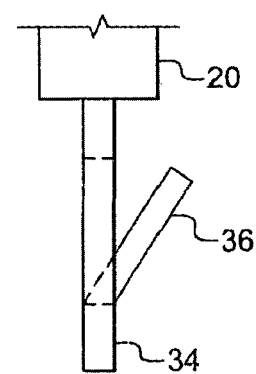
FIG. 6 shows a side view of part of one of the gripping members of the device.

As can be seen in FIGS. 4 to 6, a securing device is arranged on each lug 34 to secure the lug 34 in its associated socket 24. The securing device is in the form of a tab 36 that extends from the lug 34 to interfere with an internal surface of the socket 24 when the lug 34 is inserted into the socket 24. Each lug 34 is of a resiliently flexible material with the tab 36 forming part of the lug 34 to be urged back towards a remainder of the lug 34 when the lug 34 is inserted into the socket 24. Thus, a bias of the tab 36 serves to retain the lug 34 in the socket 24. In this example, each lug 34 is of sprung metal with the tab 36 being pivotal, against a bias of the metal, towards an opening 38 defined by the lug 34, when the lug 34 is inserted into the socket 24.

Each gripping member 20 has a generally flat, rectangular profile. Other profiles may also be suitable, if required.

The arm 12 is attached to the cup 18 so that the cup 18 opens generally orthogonally with respect to the arm 12. The arm 12 is curved and of a resiliently flexible material to enhance a throwing or hurling effect.

The handle 14, arm 12 and cup 18 are of a one piece moulding of a resiliently flexible plastics material.

Figure 7:
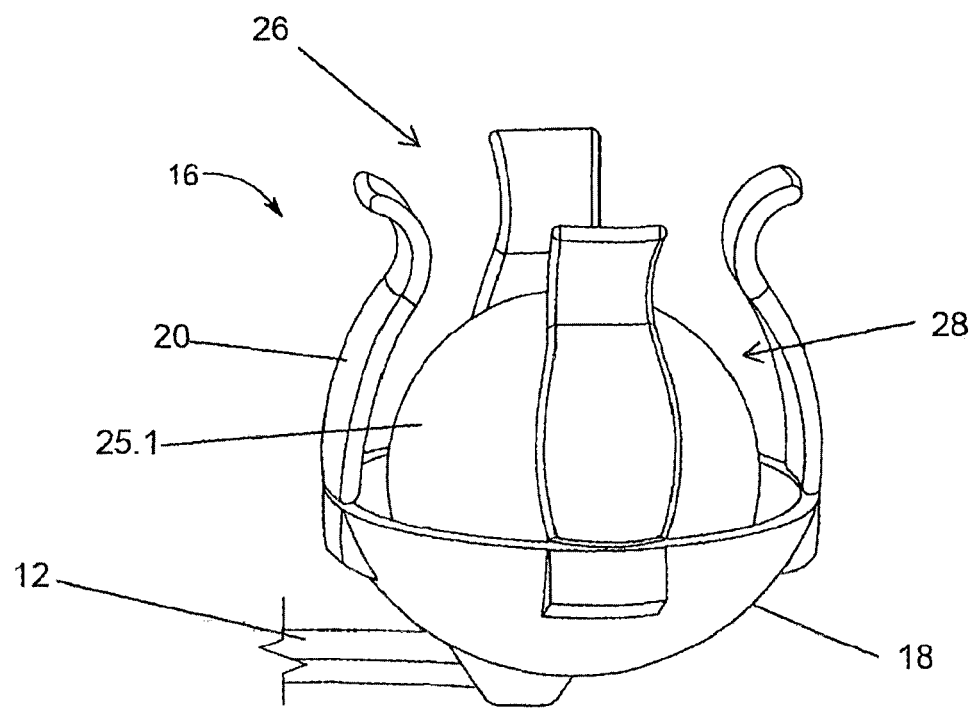
FIG. 7 shows the retaining device with a ball having a diameter of less than 50 mm.
Figure 8:
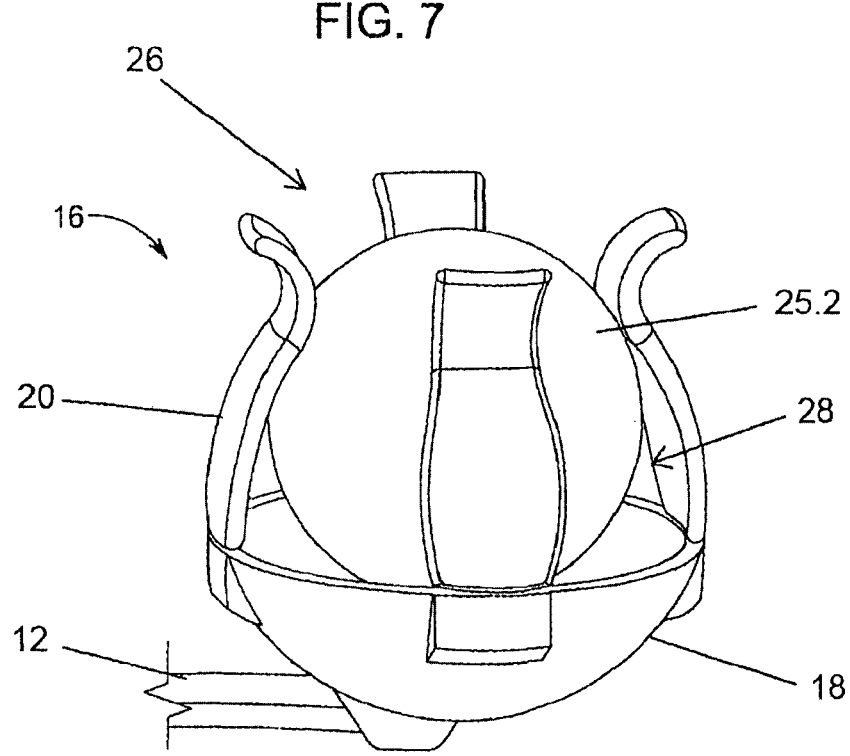
FIG. 8 shows the retaining device with a ball having a diameter of about 50 mm.
Figure 9:
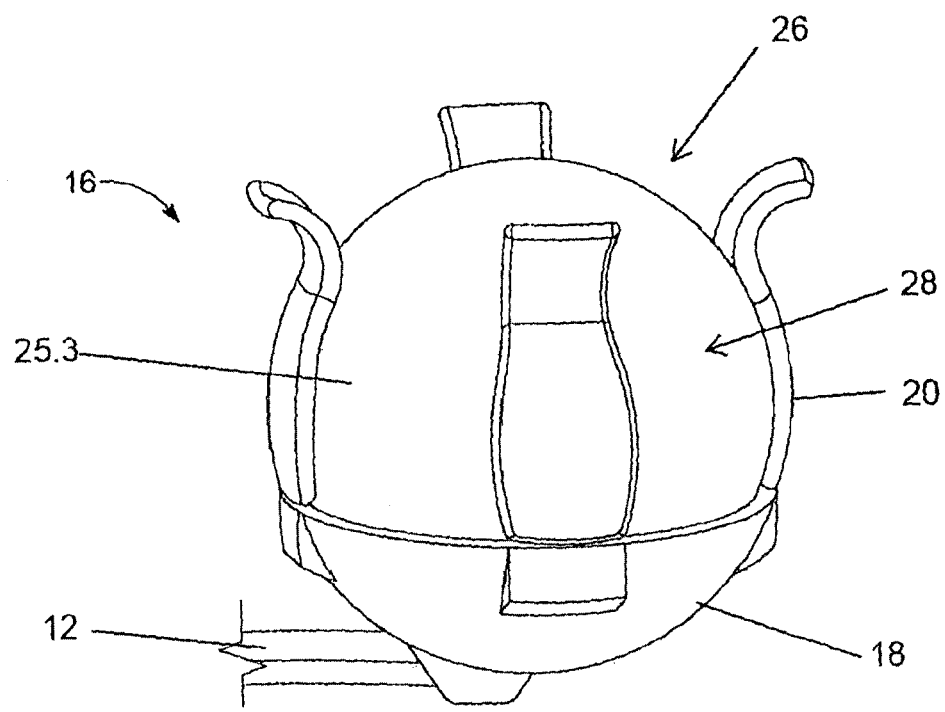
FIG. 9 shows the retaining device with a ball having a diameter of about 65 mm.
Figure 10:
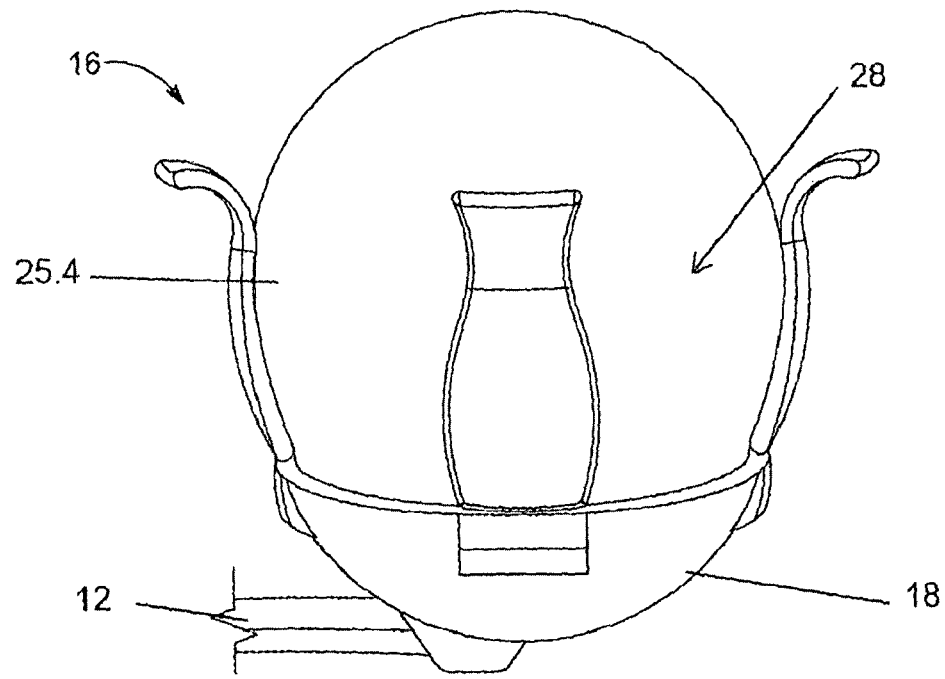
FIG. 10 shows the retaining device with a ball having a diameter of about 75 mm.

FIGS. 7 to 10 show operation of the gripping members with differently sized balls. In FIG. 7, a ball 25.1 with a diameter of less than 50 mm is shown in the retention volume 28. In FIG. 8, a ball 25.2 with a diameter of about 50 mm is shown in the retention volume 28. In FIG. 9, a ball 25.3 with a diameter of about 65 mm is shown in the retention volume 28. In FIG. 10, a ball 25.4 with a diameter of about 75 mm is shown in the retention volume 28. It will be appreciated that a simple adjustment of the size of the gripping member can increase the diameter range of balls that can be launched with the thrower 10.

The retaining device 16 can be dimensioned to suit different ranges of ball sizes. In one example the retaining device 16 has an overall width of between about 75 mm and 80 mm.

An overall length of the thrower 10 is between 650 mm and 700 mm. However, the length can vary depending on requirements. The handle 14 and arm 12 can be of any length, depending on requirements.

Figure 11:
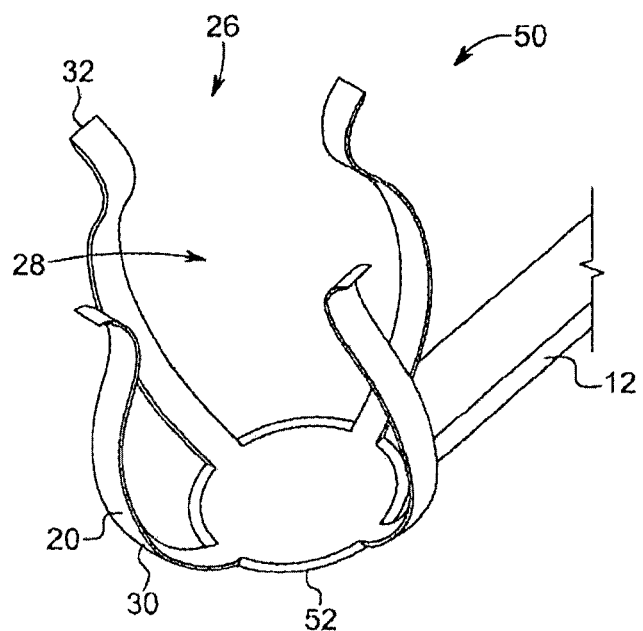
FIG. 11 shows a three-dimensional view of a retaining device of a second exemplary embodiment of a thrower, in accordance with the invention.

In FIG. 11, reference numeral 50 generally indicates a retaining device of a second exemplary embodiment of a thrower, in accordance with the invention. With reference to FIGS. 1 to 10, like reference numerals refer to like parts unless otherwise specified.

The retaining device 50 includes a base 52 that is significantly smaller than the cup 18 of the thrower 10. The base 52 is dished to accommodate a ball or some other object to be thrown. The gripping members 20 of the thrower 50 are longer than those of the thrower 10.

The gripping members 20, the base 52, the arm 12 and the handle 14 are in the form of a moulding. The moulding material can be a resiliently flexible plastics material.

The retaining device 50 can be dimensioned to suit different ranges of ball sizes. In one example, the retaining device 50 has an overall width of between about 65 mm and 70 mm.

It will be recognized that moulding the retaining device 50 in a single step may be complicated. The device 50 can thus be moulded initially to form two identical members. These are then joined to form the device 50.

Figure 12:
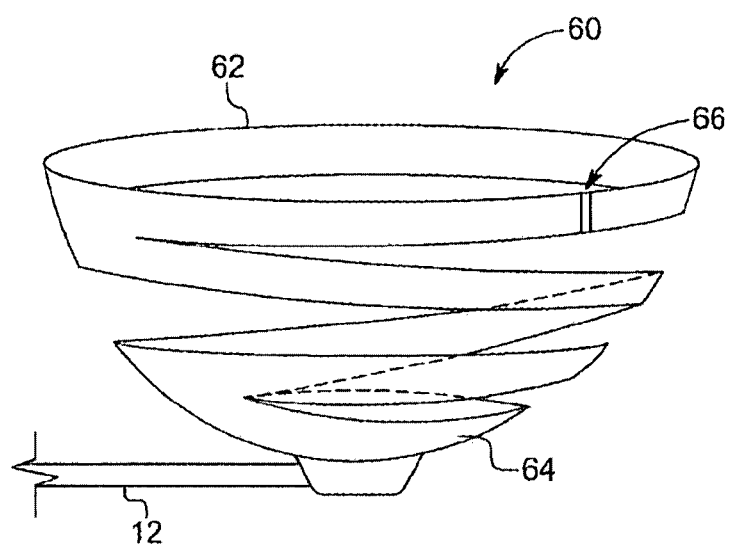
FIG. 12 shows a three-dimensional view of a retaining device of a third exemplary embodiment of a thrower, in accordance with the invention.

In FIG. 12, reference numeral 60 generally indicates a retaining device of a third exemplary embodiment of a thrower, in accordance with the invention. With reference to FIGS. 1 to 11, like reference numerals refer to like parts, unless otherwise specified.

Instead of the gripping members 20, the device 60 includes a spiral or coil 62 of a resiliently flexible material extending from, and tapering outwardly from a base 64. The coil 62 is split at 66 so that the taper of the device 60 can increase to accommodate a ball.

The device 60 can be fabricated in the same way as the device 50.

Figure 13:
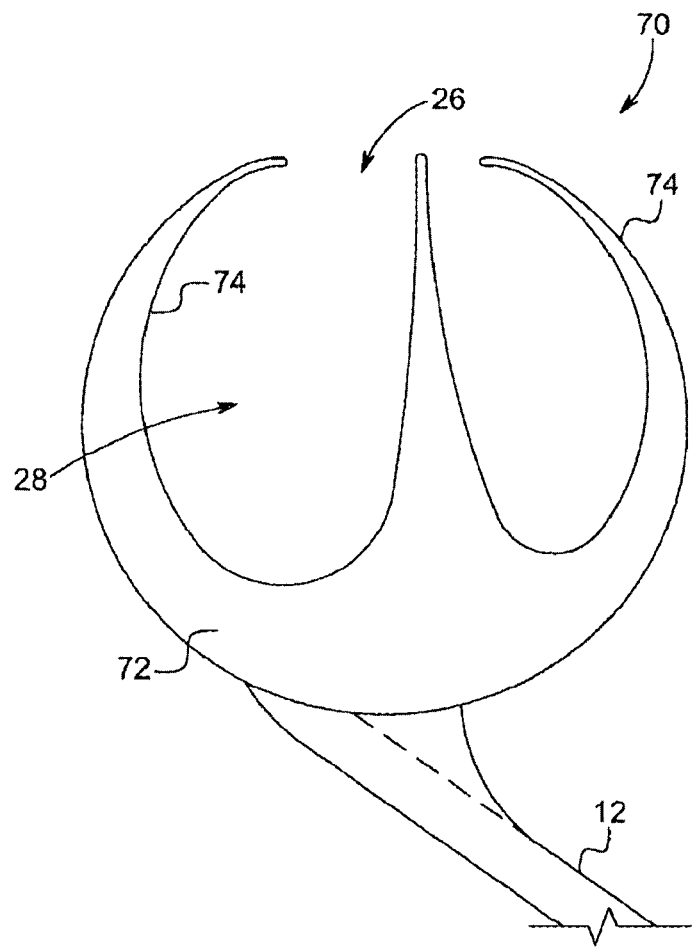
FIG. 13 shows a side view of a retaining device of a fourth exemplary embodiment of a thrower, in accordance with the invention.

In FIG. 13, reference numeral 70 generally indicates a retaining device of a fourth exemplary embodiment of a thrower, in accordance with the invention. With reference to FIGS. 1 to 12, like reference numerals refer to like parts, unless otherwise specified.

The retaining device 70 includes a part-spherical base 72 with a number of gripping members in the form of inwardly curved, claw-like fingers 74 that each taper to a point at a free end. In this example, there are four fingers 74. The fingers 74 curve inwardly partially to enclose the retention volume 28. The fingers 74 are configured so that the device 70 can be pushed onto the ball or object with the fingers 74 initially bending inwardly and subsequently snapping back to retain the ball in the volume 28.

In one example, the device 70 has an overall diameter of between about 90 mm and 100 mm. An overall diameter of the entrance zone 26 is between 45 mm and 50 mm. A gap between consecutive fingers does not exceed between 45 mm and 50 mm.

The device 70 can be fabricated in the same way as the device 50.

Figure 14:
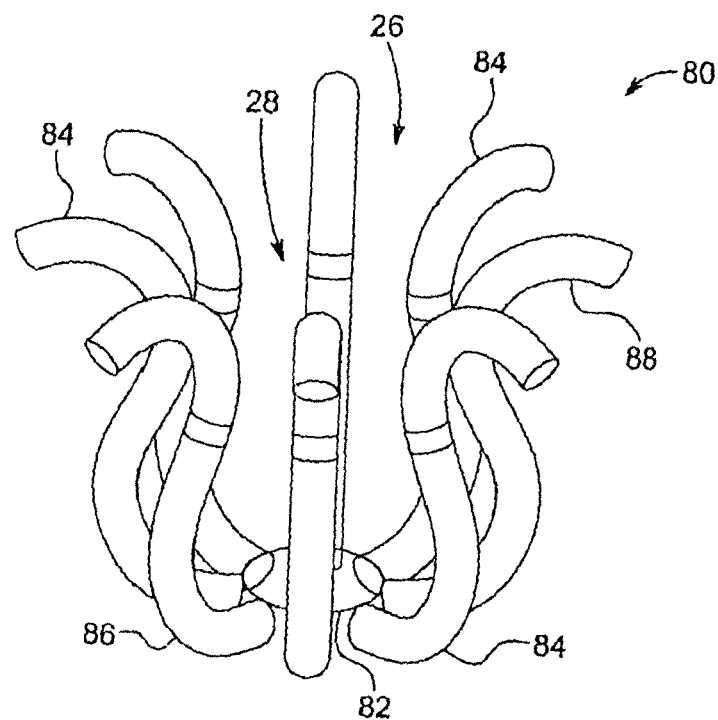
FIG. 14 shows a three dimensional view of a retaining device of a fifth exemplary embodiment of a thrower, in accordance with the invention.

In FIG. 14, reference numeral 80 generally indicates a retaining device of a fifth exemplary embodiment of a thrower, in accordance with the invention. With reference to FIGS. 1 to 13, like reference numerals refer to like parts, unless otherwise specified.

The device 80 includes a base 82. A number of gripping members 84 extend from the base 82. As with the gripping members 20, the members 84 are elongate and have an inward curved portion 86 and outward curved portion 88. The device 80 thus operates in the same manner as the device 10.

In this embodiment, there are eight gripping members 84 with a generally circular cross section. However, the inventor(s) envisages that there could be a different number of gripping members 84 and the cross sections could have a different shape. As with the device 10, the members 84 are also of a resiliently flexible material allowing the entrance zone 26 to enlarge allowing passage of the ball into the retention volume 28.

Figure 15:
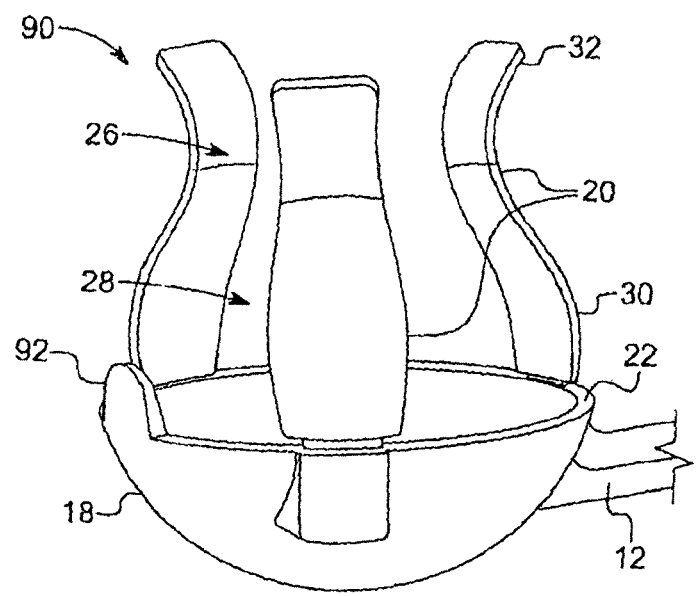
FIG. 15 shows side view of a retaining device of a sixth exemplary embodiment of a thrower, in accordance with the invention.
Figure 16:
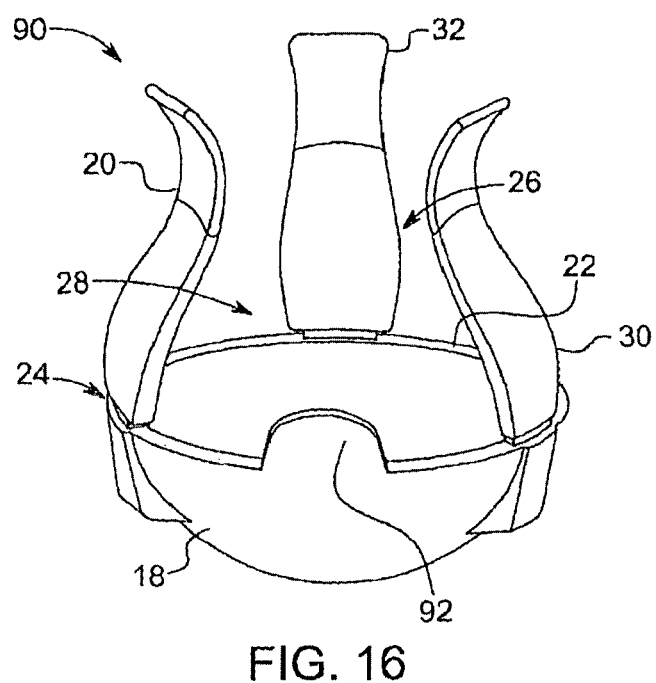
FIG. 16 shows a front view of the retaining device of FIG. 15.
Figure 17:
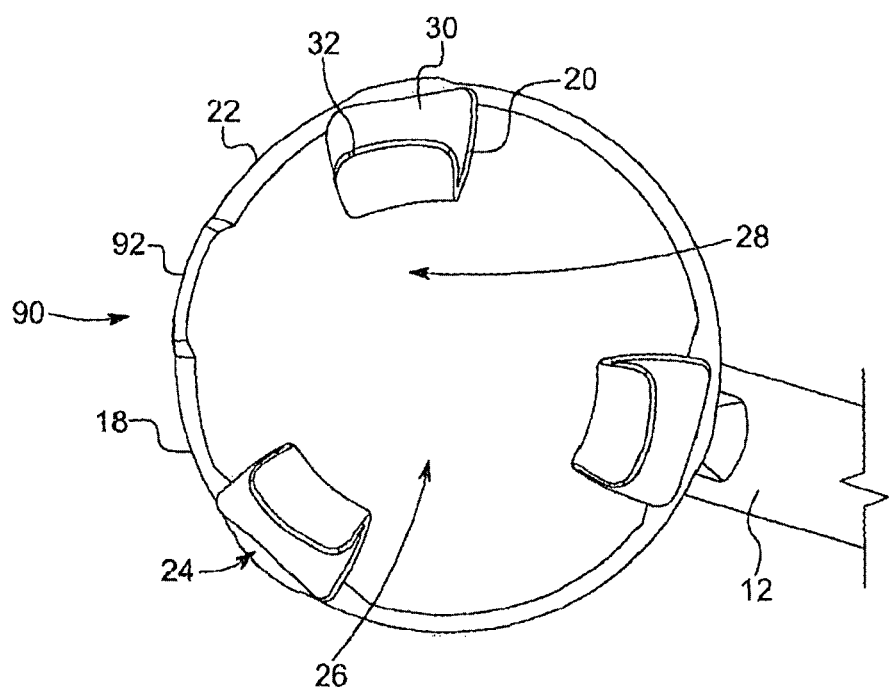
FIG. 17 shows a plan view of the retaining device of FIG. 15.

In FIGS. 15 to 17, reference numeral 90 generally indicates an exemplary embodiment of a ball thrower, in accordance with the invention. With reference to the preceding drawings, like reference numerals refer to like parts, unless otherwise specified. In particular, with reference to FIGS. 1 to 10, like reference numerals to like parts.

With the thrower 10 there are four gripping members 20. These are spaced equally about the periphery 22, with one pair of the gripping members 20 being aligned with the handle 12 and thus the direction in which the object is to be thrown. In that configuration, the gripping member 20 of that pair that is distal with respect to the handle 12 and the material defining its associated slot can be subject to a significant amount of stress, particularly when the object is thrown vigorously or is heavier than a tennis ball, for example.

Thus, instead of that particular gripping member, the thrower 90 includes a tab or lug 92 that is shorter than the gripping members 20 and extends from the periphery 22 aligned with the handle and the direction in which the object is to be thrown. The tab or lug 92 cooperates with the gripping members 20 to retain the object in the retention volume 28 and, since it is more rigid and shorter than the gripping members 22, is able to resist damage to itself and the base or cup 18 during use. The tab or lug 92 and the base or cup 18 can form part of a common moulding.

The inventor(s) envisage that one or two gripping members 20 can be used with the tab or lug 92, instead of three gripping members 20. A person skilled in the art will understand that is would be relatively straightforward to provide a single gripping member 20 opposite the tab or lug 92. The gripping member 20 could then be dimensionally adjusted to function correctly. Likewise, a person skilled in the art will understand that it would be relatively straightforward to provide two spaced gripping members 20 opposite the tab or lug 92. The gripping members 20 could then be positioned to function correctly. Also, if necessary, the gripping members 20 could be dimensionally adjusted also to function correctly.

Figure 18:
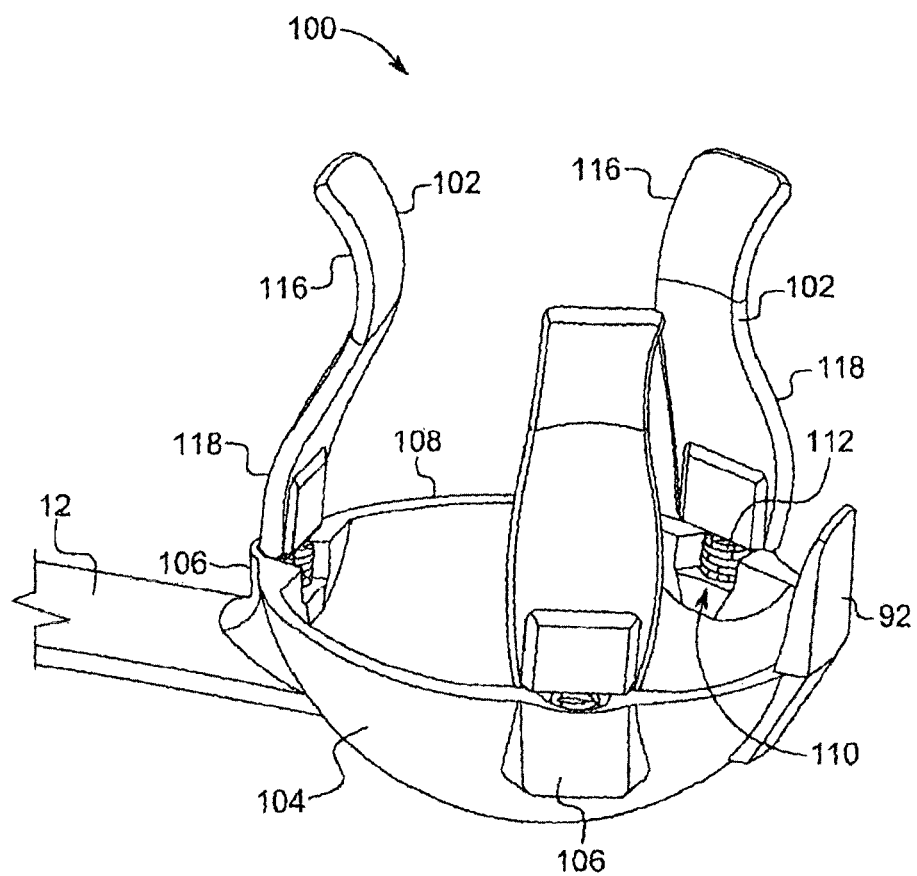
FIG. 18 shows one three dimensional view of a retaining device of a seventh exemplary embodiment of a thrower, in accordance with the invention.
Figure 19:
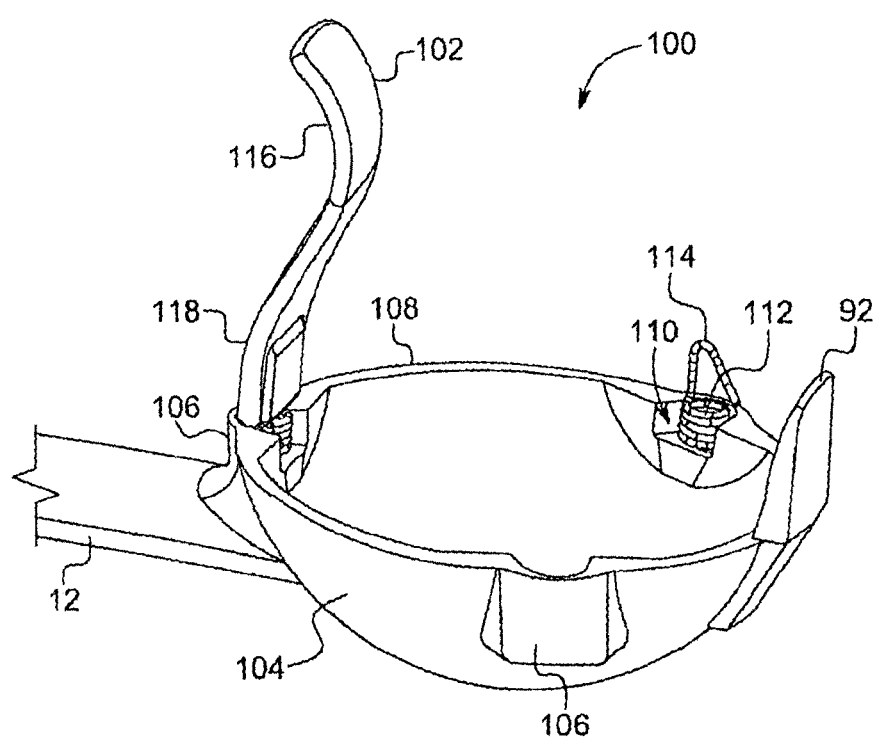
FIG. 19 shows another three dimensional view of the retaining device of FIG. 18.

In FIGS. 18 and 19, reference numeral 100 generally indicates an example of a ball thrower, in accordance with the invention. With reference to the preceding drawings, particularly FIGS. 15 to 17, like reference numerals refer to like parts, unless otherwise specified.

This embodiment is similar to the thrower 90. However, the thrower 100 has gripping members 102 and a cup 104 that differ from those of the ball thrower 90.

The cup 104 has three reinforced or thickened portions 106 about its periphery 108. Each portion 106 defines a rebate or recess 110. A spring 112 is mounted in each recess 110. Each spring 112 is a coil spring, with a length 114 of spring wire of the spring 112 extending past the periphery and bent back towards a coil of the spring 112.

As with the gripping members 20, the members 102 are elongate and have an inward curved portion 116 and outward curved portion 118. The device 100 thus operates in the same manner as the device 10.

Each gripping member 102 defines a slot or opening in a free end of the outward curved portion 118. Each of the lengths 114 is received in a respective slot to fasten the gripping members 102 to the periphery 108. Thus, as the gripping members 102 are urged outwardly, the springs 102 can bend to accommodate that outward movement. This serves to alleviate strain on the gripping members 102. That helps to avoid failure due to repeated bending of the gripping members 102.

As with the thrower 90, the thrower 100 can also include a single gripping member 102 opposite the lug or tab 92 or two gripping members 102 are positioned with respect to the lug or tab 92 to function properly.

The various embodiments described above can be used to pick an object to be thrown up from a substrate. As a result, it is not necessary for a user to handle the object so avoiding mucus, saliva, spittle and dirt that may be on the object. Also the user can avoid the need to bend over repeatedly. Furthermore, the nature of the retaining device of the various embodiments allows differently sized objects to be picked up and thrown.

Various substantially and specifically practical and useful exemplary embodiments of the claimed subject matter, are described herein, textually and/or graphically, including the best mode, if any, known to the inventors for carrying out the claimed subject matter. Variations (e.g., modifications and/or enhancements) of one or more embodiments described herein might become apparent to those of ordinary skill in the art upon reading this application. The inventors expect skilled artisans to employ such variations as appropriate, and the inventors intend for the claims based on the subject matter of this application to be practiced other than as specifically described herein. Accordingly, as permitted by law, such subject matter includes and covers all equivalents of the subject matter and all improvements to the subject matter. Moreover, every combination of the above described elements, activities, and all possible variations thereof are encompassed by the subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of the subject matter unless otherwise stated. No language in the specification should be construed as indicating any non-claimed subject matter as essential to the practice of the claimed subject matter.

Thus, regardless of the content of any portion (e.g., title, field, background, summary, description, abstract, drawing figure, etc.) of this application, unless clearly specified to the contrary, such as via explicit definition, assertion, or argument, or clearly contradicted by context, with respect to any claim to the subject matter, whether of this application and/or any claim of any application claiming priority hereto, and whether originally presented or otherwise:

(a) there is no requirement for the inclusion of any particular described or illustrated characteristic, function, activity, or element, any particular sequence of activities, or any particular interrelationship of elements;

(b) no characteristic, function, activity, or element is "essential";

(c) any elements can be integrated, segregated, and/or duplicated;

(d) any activity can be repeated, any activity can be performed by multiple entities, and/or any activity can be performed in multiple jurisdictions; and (e) any activity or element can be specifically excluded, the sequence of activities can vary, and/or the interrelationship of elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Moreover, when any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Every portion (e.g., title, field, background, summary, description, abstract, drawing figure, etc.) of this application, is to be regarded as illustrative in nature, and not as restrictive, and the scope of subject matter protected by any patent that issues based on this application is defined only by the claims of that patent.

The invention claimed is:

1. A thrower that comprises:
an elongate arm;
a handle attached to one end of the arm;
one of a generally part-ellipsoidal and generally part-spherical base attached to an opposite end of the arm;
at least three gripping members attached to, and extending from, a periphery of the base; and
a lug that is shorter and more rigid than each of the at least three gripping members, attached to, and extending from, the periphery of the base, most distal with respect to the handle and with reference to each of the at least three gripping members, and aligned with the handle to cooperate with each of the at least three gripping members to resist damage to itself and the base during use, each of the at least three gripping members and the lug being configured to define a retention volume together with the base and an entrance zone to the retention volume, the, or each, gripping member having an inward curved portion and an outward curved portion and being resiliently displaceable with respect to the base so that when the outward curved portion is urged against an object to be thrown, each of the at least three gripping members moves to enlarge the entrance zone to accommodate the object to be thrown and subsequently to retain the object in the retention volume.

2. The thrower as claimed in claim 1, in which one of the at least three gripping members aligns with the lug and the handle.

3. The thrower as claimed in claim 1, in which a number of slots are defined in a peripheral edge of the base, each of the at least three gripping members having a projection extending from a free end of the outward curved portion and each projection being receivable in a respective slot to secure each of the at least three gripping members to the base.

4. The thrower as claimed in claim 1, in which each of the at least three gripping members defines an opening or a slot in the free end of the outward curved portion and a number of retaining devices are arranged about the peripheral edge of the base, the retaining devices being receivable in each slot of the respective gripping member to retain the gripping members in position.

5. The thrower as claimed in claim 4, in which the, or each, retaining device is includes a spring that is mounted in a reinforced portion of the base and extends from the peripheral edge of the base to be received in each respective slot of the gripping member to impart further resilient characteristics of each of the at least three gripping members, alleviating strain on each of the at least three gripping members.

* * * * *